United States Patent [19]

Shah

[11] 4,104,566
[45] Aug. 1, 1978

[54] ANALOG CORRECTION SYSTEM
[75] Inventor: Naren Chimanlal Shah, Indian Harbor Beach, Fla.
[73] Assignee: Harris Corporation, Cleveland, Ohio
[21] Appl. No.: 681,588
[22] Filed: Apr. 29, 1976
[51] Int. Cl.² ............................................. H01J 29/56
[52] U.S. Cl. ..................................... 315/371; 315/367
[58] Field of Search ................ 315/370, 371, 365, 367
[56] References Cited
U.S. PATENT DOCUMENTS

| | | | |
|---|---|---|---|
| 3,205,377 | 9/1965 | Nix, Jr. ................................. | 315/370 |
| 3,512,039 | 5/1970 | Klensch ............................... | 315/370 |
| 3,763,393 | 10/1973 | White ................................... | 315/370 |
| 3,786,477 | 1/1974 | Baumgartner ...................... | 315/367 |
| 3,825,796 | 7/1974 | Bello .................................... | 315/371 |

Primary Examiner—Maynard R. Wilbur
Assistant Examiner—T. M. Blum

[57] ABSTRACT

A compensation circuit for use in a display system for displaying graphical images on an energy responsive surface with a radiant energy beam. The compensation circuit linearizes the relation between a control signal and the amount of deflection of the radiant energy beam upon the radiant energy responsive surface. A nonlinear circuit provides an extremely accurate compensation signal which is non-monotonically related to the magnitude of the control signal. When the control signal is combined with the compensation signal, a compensated deflection control signal is provided having a compensation signal component which generally diminishes for increasing deflections of the radiant energy beam. The amount of circuitry necessary to provide four quadrant compensation is diminished by providing a compensation signal based upon only one quadrant, and then switching the sign of the compensated deflection signal so produced to correspond to the desired deflection direction. Potentiometers are included which provide small variations in the compensation circuit response in different quadrants so as to correct for nonsymmetries in the deflection system. Also, independent on-axis and off-axis correction signals are produced so as to simplify alignment procedures. The on- and off-axis correction signals are then combined to provide the total compensation signal.

10 Claims, 10 Drawing Figures

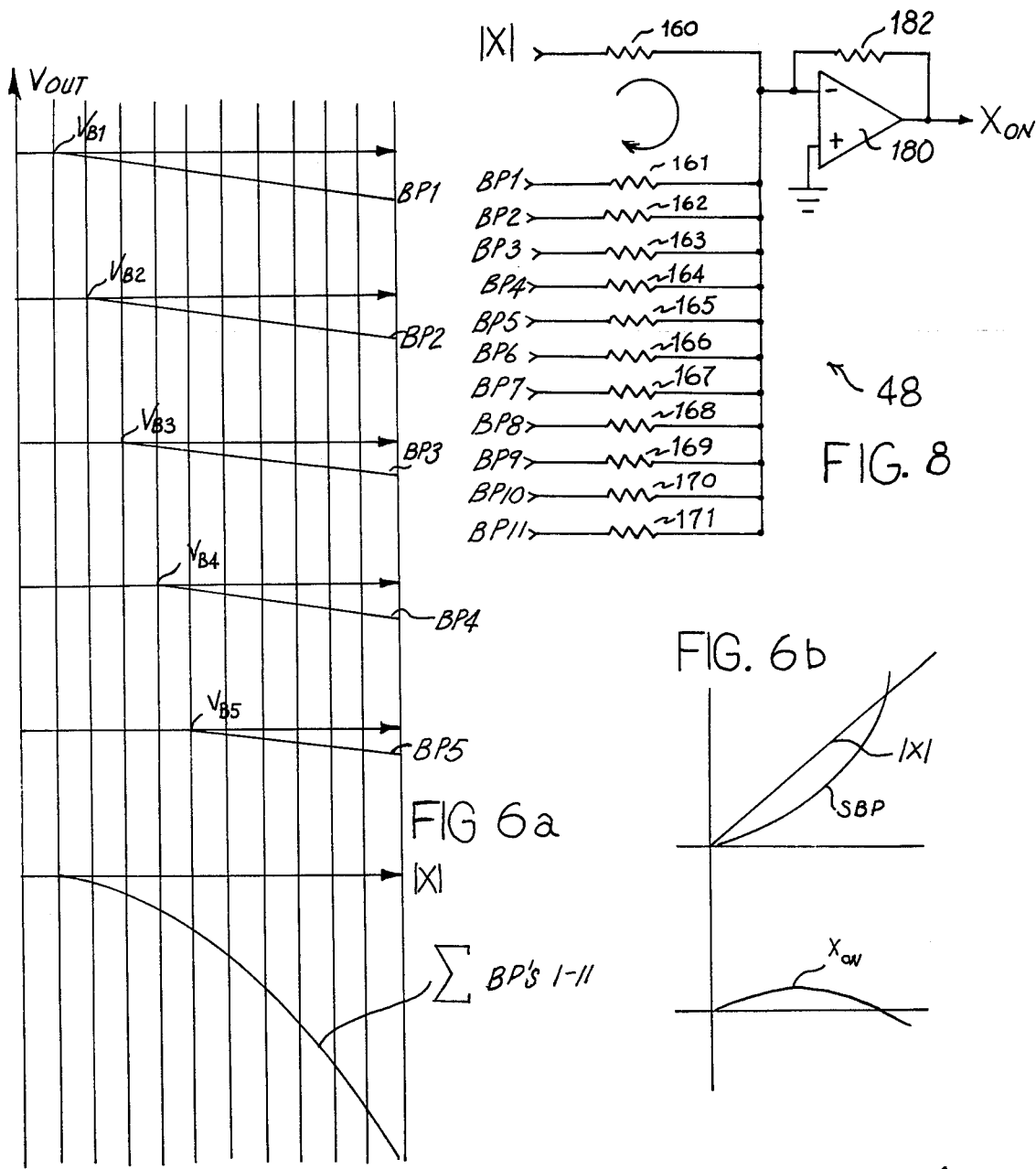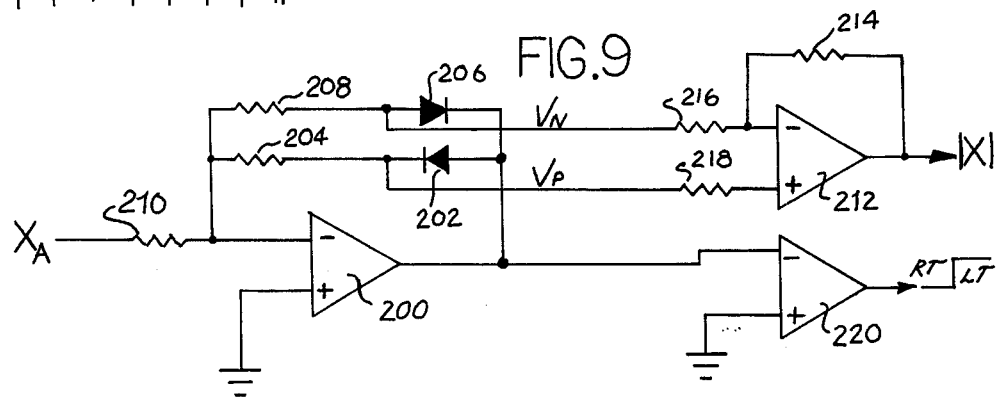

ANALOG CORRECTION SYSTEM

BACKGROUND AND FIELD OF THE INVENTION

This invention relates to the art of display systems and, more particularly, to apparatus for compensating for nonlinear response characteristics thereof.

The invention is particularly useful in compensating for nonlinear response characteristics of a cathode ray tube. However, it is to be appreciated that the invention has broader applications and may, for example, be used to compensate for nonlinear response characteristics of other display devices, such as devices in which the beam is generated by a laser mechanism.

Cathode ray tubes have long been used to provide visual displays. More recently, cathode ray tubes have found increasing use in the art of phototypesetting. Control of these devices has been hampered by various nonlinear response characteristics inherent therein. Pin cushion distortion, for example, arises as a result of the nonlinear relation between the control signal applied to the beam deflection system and the acutal beam deflection produced thereby. It is desirable to provide a specialized circuit for correcting this nonlinearity. Such a correcting circuit would characteristically be interposed between the source of the control signals and the display device. The nonlinear response characteristic of this correction circuit would combine with the nonlinear response of the display device to provide an overall linear relation between the control signal applied to the correction circuit and actual deflection of the beam.

Deflection systems commonly provide deflection of the radiant energy beam in two orthogonal directions whereby the beam can be positioned at any point on a display surface through control of two deflection circuits. Correction of the non-linearity in deflection response of these systems is hindered by the interdependency of the corrections necessary along the axes. In other words, the correction to be applied along either axis is a function of the deflection to be achieved along both axes.

U.S. Pat. Nos. 3,825,796 and 3,512,039 exemplify several previous methods of achieving the necessary correction. One previous method combines a monotonic correction voltage together with the control signal so that the amount of the correction continually increases with increasing control signals. Because of this, the correction signal becomes quite large near the extremities of the display surface. These correction signals have proved to be difficult to generate accurately.

It is essential, particularly in phototypesetting systems, that this correction be as exact as possible. Additionally, it is desirable that the characteristics of the circuit be easily matched to the individual characteristics of a specific display device. The circuit should also be uncomplicated and economical to manufacture.

The present invention accomplishes these goals by providing apparatus which generates a correction signal and combines this signal with an uncompensated control signal to provide a compensated radiant energy beam deflection signal. The compensation signal so produced is functionally related to the control signal in a non-monotonic relation so that the amount of correction remains relatively small throughout the entire display surface. On-axis and off-axis correction signals are independently produced so as to simplify any necessary adjustments thereto. Circuitry is provided for developing correction signals for only a single quadrant of the total display surface, and additional circuitry adjusts and inverts the correction signal so produced so as to provide correction signals which are proper for the actual quadrant in which the control signals lie.

BRIEF DESCRIPTION OF THE DRAWINGS

The foregoing and other aspects and advantages of the present invention will become more readily apparent from the following description of the preferred embodiment as taken in conjunction with the accompanying drawings which are a part hereof and wherein:

FIGS. 6a and 6b are graphical representation of the signals generated by the correction circuits;

FIG. 8 is a schematic diagram of the adder used in the present invention; and,

FIG. 9 is a schematic diagram of the absolute value circuit used in the present invention.

DETAILED DESCRIPTION

Figure 1:
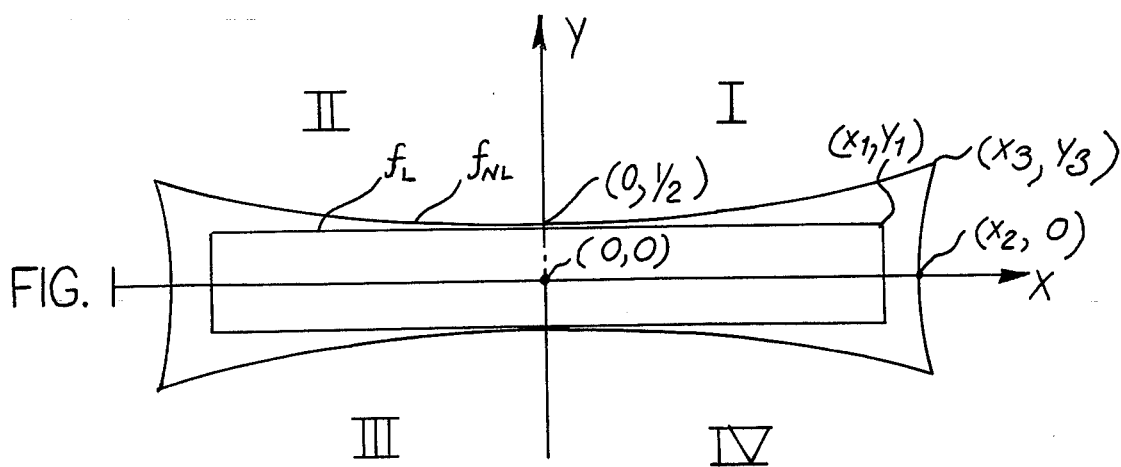
FIG. 1 is a graphical representation of pin cushion distortion.

Referring first to FIG. 1, the display surface of a radiant energy display system is graphically depicted. The deflection of the radiant energy beam is produced along two orthogonal axes, X and Y. The position indicated by the coordinates (0,0) represents the "at rest" position of the beam. If no control signals are applied to the deflection system, the beam will intersect the display surface at this point. If both control signals are positive, the point of intersection of the beam and the display surface will be in the first quadrant of the display surface (labeled I in FIG. 1). Control signals having different algebraic signs will produce deflections in the other three quadrants (labeled II, III and IV).

If the response of the system to the control signals were linear, the application of control signal $X_1$ to the X deflection circuit would produce a deflection of $X_1$ in the X direction, and a control signal of $Y_1$ to the Y deflection circuit would produce a deflection of $Y_1$ in the Y direction. Also, if both signals were applied simultaneously to the respective deflection circuits, the radiant beam would intersect the display surface at the position marked $(X_1, Y_1)$. Due to the nonlinearity inherent in the system, however, a control signal $X_1$ will instead produce an X deflection of $X_2$ while a control signal $Y_1$ will produce a Y deflection of $Y_2$. To compound the problem, if control signals $X_1$ and $Y_1$ are simultaneously applied to the respective deflection circuits, the beam will not intersect the display surface at the point $(X_2, Y_2)$, but will rather intersect at a third point $(X_3, Y_3)$. As a result of this nonlinearity, control signals which would generate the rectangle $f_L$ in a linear system will instead produce the nonlinear pattern $f_{NL}$ in this display system. It will be noted that this nonlinear response is symmetric about both axes.

Figure 2:
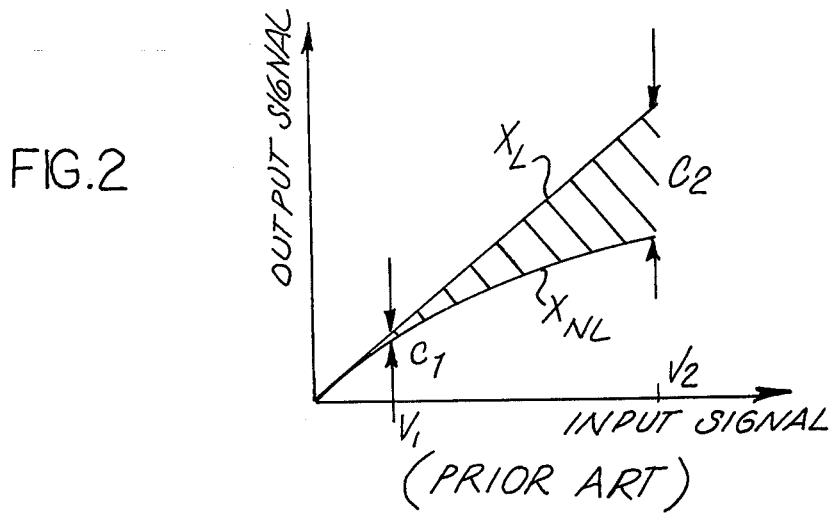
FIG. 2 is a graphical representation of the operation of a prior art compensation circuit.

FIG. 2 graphically depicts the operation of a prior art correction circuit. The line labeled $X_{NL}$ represents the desired transfer characteristics of a correction circuit. The line labeled $X_L$ represents the transfer characteristics of a linear system.

Prior art systems have produced this nonlinear transfer characteristic in several ways. Some systems have acted directly upon the incoming linear signal through use of a nonlinear attenuation network. Such attenuation networks produce progressively greater amounts of attenuation as the magnitude of the incoming signal increases. The net result is the nonlinear response characteristic shown. A second method involves the generation of a separate correction signal which is combined with the control signal to produce the desired compensation. These systems have, in the past, produced correction signals monotonically related to the magnitude of the control signal; i.e. the greater the incoming signal, the greater the correction applied thereto. This correction is indicated by the shaded area in FIG. 2. It will be seen that a relatively small correction signal, $C_1$, is generated for a small input signal, $V_1$, while a correspondingly larger correction signal, $C_2$, results from a larger input signal, $V_2$.

Figure 3:
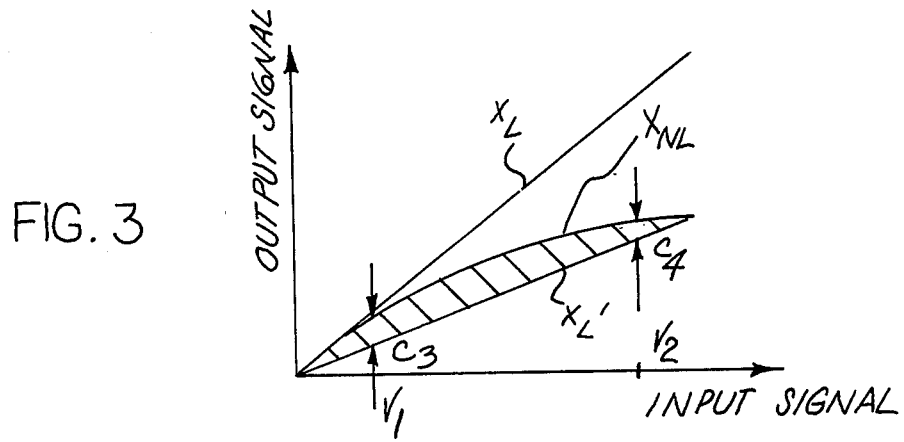
FIG. 3 is a graphic representation of the operation of the present invention.

The present invention provides a correction signal which is non-monotonically related to the control signal; i.e., the correction signal at first grows larger with increases in the magnitude of the control signal, while still further increases in the magnitude of the control signal produce a decrease in the size of the correction signal. This is possible because the amount of correction necessary is reduced if the incoming signal is attenuated. This attenuated input signal is indicated in FIG. 3 by the line labeled $X_L'$. The correction signal added thereto is again indicated by the shaded area of the graph. Through comparison of the shaded areas of FIGS. 2 and 3, it will be seen that the correction necessary for a small input voltage $V_1$ is approximately the same in both cases. On the other hand, the correction to be applied to a relatively large input signal $V_2$ is quite small for the present invention while being quite large in the prior art. The generation of such a correction signal can be more accurately accomplished, thus providing more precise linearization of the overall response characteristics of the system.

Figure 4:
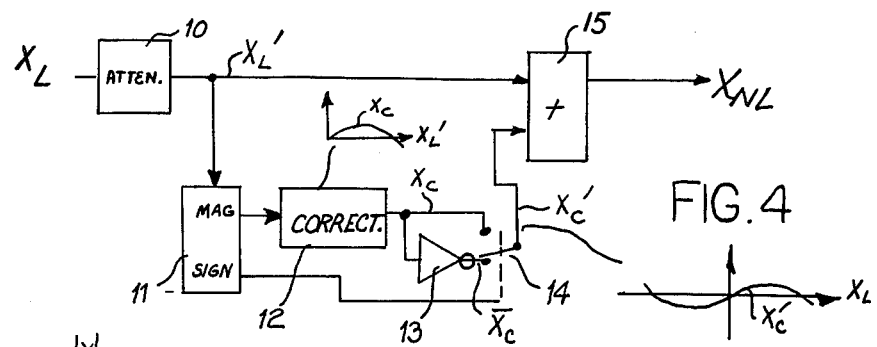
FIG. 4 is a general block diagram of the correction circuit used herein.

FIG. 4 indicates the broad blocks utilized in the present invention. An uncompensated control signal $X_L$ is attenuated by an attenuator 10 to provide an attenuated control signal $X_L'$. The attenuated signal $X_L'$ is directed to a circuit 11 which separates it into "magnitude" and "sign" components. A correction circuit 12 responds to the magnitude component to generate a correction signal. This correction circuit has a transfer characteristic with the shallow inverted bowl shape shown in FIG. 4, thus providing the non-monotonic characteristic previously described. The sign information is unnecessary to the determination of this correction signal because of the previously mentioned symmetry of the deflection system nonlinearity. However, the algebraic sign of the correction signal is dependent upon the sign of the control signal. Consequently, an inverter 13 is included which responds to the correction signal $X_c$ to provide an inverted correction signal $\overline{X}_c$. The choice of which correction is to be applied to the control signal is determined by the sign component of the control signal. The sign output of circuit 11 thus controls the operation of a switch 14 which selects the correction signal having the proper algebraic sign. The correction signal so selected is additively combined with the attenuated control signal $X_L'$ by a summing circuit 15, thereby providing the compensated output signal $X_{NL}$. It will be appreciated that the use of circuit 11 and switch 14 allow considerable simplification of the circuitry necessary in connection circuit 12, which no longer needs to provide correction signals for negative input signals.

Figure 5:
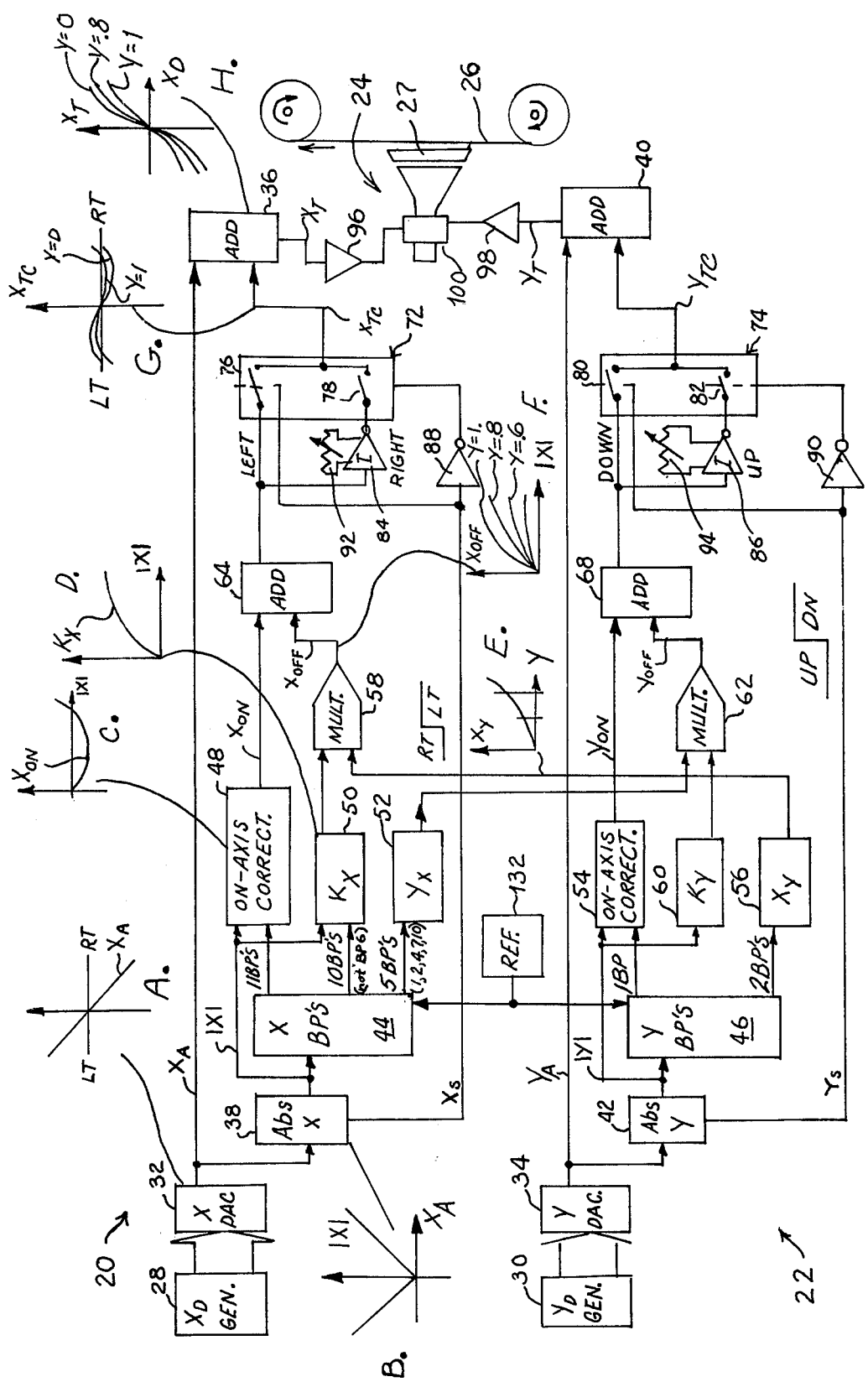
FIG. 5 is a detailed block diagram of a correction circuit in accordance with the present invention.

Referring now to FIG. 5, a more detailed description of this system will be given. It will be seen that two similar circuits 20 and 22 provide the deflection signals for the X and Y deflection systems, respectively. These signals, $X_t$ and $Y_t$, are directed to a cathode ray deflection system 24 which deflects a radiant energy beam so as to selectively expose a strip of photosensitive film 26 through an optical system 27.

The graphs in FIG. 5 indicated by the letters A through H represent the transfer characteristics of various blocks in the X correction system. Because the transfer characteristics of corresponding blocks in the Y correction system are substantially similar, these graphs have not been included.

Several of the blocks shown in FIG. 5 will be described hereinafter as "adders". This term, as used herein, will be understood to refer to a summing circuit which provides an incidental algebraic inversion of the sum signal. Thus, if an adder has four inputs A, B, C, and D; the output thereof will be $-(A+B+C+D)$.

$X_d$ generator 28 and $Y_d$ generator 30 represent the sources of the uncompensated digital control signals used to position the radiant energy beam. Digital to analog converters (DAC) 32 and 34 serve to interface these digital signal sources with the analog correction circuit. The analog output of DAC's 32 and 34 correspond to the attenuated linear signal $X_L'$ referred to with respect to FIG. 4. The X analog signal $X_a$ is directed to adder 36 and absolute value circuit 38. In similar fashion, the Y analog signal $Y_a$ is directed to adder 40 and absolute value circuit 42. As shown in graph A of FIG. 5, the output signal of DAC 32 is linearly related to the desired position of the radiant energy beam and has a negative algebraic sign of X positions to the right of the Y axis, and positive sign for X positions to the left of the Y axis.

Absolute value circuits 38 and 42 correspond to circuit 11 of FIG. 4. The transfer characteristic of absolute value circuit 38 is shown in graph B of FIG. 5. It will be seen that the output signal produced by this circuit remains positive regardless of the algebraic sign of $X_a$. The output of absolute value circuits 38 and 42 are respectively directed to breakpoint circuits 44 and 46.

X breakpoint circuit 44, which will be described in greater detail hereinafter with reference to FIG. 7, has eleven outputs derived from eleven separate breakpoint amplifiers. Each breakpoint amplifier is designed to provide a ground potential output for input signals below a predetermined threshold and to respond linearly to input signals above this threshold, or "breakpoint". The transfer characteristics of breakpoint amplifiers 1 through 5 (BP1 through BP5) are shown in FIG. 6a. The input of each breakpoint amplifier is connected to the input of absolute value circuit 38. The breakpoint amplifiers all have different breakpoints, $V_{B1} - V_{B11}$, whereby eleven different breakpoints exist which are spread over the entire range of possible X values.

A number of different nonlinear circuit responses can be generated by combining the outputs of selected breakpoint amplifiers. For example, the addition of all eleven breakpoint amplifier outputs would result in the nonlinear transfer characeristic shown in the graph at the bottom of FIG. 6a.

For the specific embodiment being described, Y breakpoint circuit 46 includes only two breakpoint amplifiers. This is because the radiant energy beam need only be positioned over a comparatively small range of Y values in the phototypesetting system for which this circuit was designed. It will be appreciated that, for applications requiring the use of a broader range of Y values, the number of breakpoint amplifiers included in Y breakpoint circuit 46 could be increased so as to correspond to the number of breakpoint circuits employed in X breakpoint circuit 44.

Referring to FIG. 6b, the desired on-axis correction characteristic can be generated by subtracting a nonlinear signal (SBP) from the signal produced by absolute value circuit 38 ($|X|$). A signal corresponding to nonlinear signal SBP can be conveniently synthesized by combining the outputs of all eleven breakpoint amplifiers. Since, as shown in FIG. 6a, the actual signals generated by the breakpoint amplifiers are negative, the desired output can be produced by summing the signals produced by the breakpoint amplifiers with the signal generated by absolute value circuit 38. This function is performed by adder 48. Because the adder introduces an incidental inversion of the sum signal, the actual transfer characteristic of the on-axis correction circuit takes the form shown in graph C of FIG. 5. This signal $X_{on}$ represents the entire correction to $X_a$ necessary when the radiant energy beam is to be positioned at some point along the X axis, i.e., when $Y_a = 0$.

A corresponding on-axis correction for the Y deflection system is provided by on-axis correction circuit 54. This circuit additively combines the signal provided by absolute value circuit 42 with the output of one of the breakpoint amplifiers included within Y breakpoint circuit 46 to thereby produce the Y on-axis correction signal $Y_{on}$.

Off-axis correction is provided in the X deflection circuit by multiplying together two signals, $K_X$ and $X_Y$, bearing functional relations to the X and Y control signals, respectively. $K_X$ is developed by additively combining the output of absolute value circuit 38 and the outputs of ten of the breakpoint amplifiers (all breakpoint amplifier outputs except BP6) of breakpoint circuit 44, in an adder circuit 50. The other signal, $X_Y$, is provided by additively combining the outputs of both of the breakpoint amplifiers of breakpoint circuit 46. Adder circuit 56 performs this function. The signals provided by adder circuits 50 and 56 are multiplicatively combined by analog multiplier 58. Since analog multipliers are well known in the art, the multipliers used herein will not be described in further detail.

Off-axis correction is provided in the Y deflection circuit by a similar multiplicative combination of two signals, $K_Y$ and $Y_X$. $Y_X$ is provided by adder 52, while the other signal, $K_Y$, is generated by adder 60. The outputs of breakpoint amplifiers 1,2,4,7, and 10 of X breakpoint circuit 44 are additively combined by adder 52. Since adder 60 responds to only a single input, the output thereof corresponds to the inverse of that input.

For both the X and Y correction circuits the on-axis and off-axis correction signals are additively combined to provide total correction signals. Thus, adder 64 combines the on-axis and off-axis correction signals for the X deflection system, while adder 68 additively combines the on-axis and off-axis correction signals in the Y deflection system. The X and Y total correction signals so produced are directed to analog switches 72 and 74, respectively, which may conveniently comprise solid state FET switches. Since such switches are readily available, they will not be described in extensive detail. For illustrative purposes, each switch is shown as two single-pole single-throw (SPST) switches having one contact commonly connected. Thus, switch circuit 72 includes two SPST switches 76 and 78, while switch circuit 74 includes SPST switches 80 and 82. One contact of switch 76 is connected to the corresponding contact on switch 78. This common contact is further connected to adder 36. The output of adder 64 is directed to the other contact of switch 76. The output of adder 64 is also connected through inverter 84 to the other contact of switch 78. The switch circuit in Y deflection circuit is connected similarly, having the output of adder 68 connected directly to switch 80, and indirectly to switch 82 through inverter 86. Again, the other contacts of switches 80 and 82 are commonly connected to one input of adder 40.

Switch circuit 78 is controlled by the sign output $X_s$ of absolute value circuit 38, while switch circuit 80 is controlled by the sign output $Y_s$ of absolute value circuit 42. These sign outputs indicate the algebraic sign of the analog signal being inputted thereto. Thus, if $X_a$ has a positive algebraic sign, $X_s$ will be at a digital "1" value whereas if $X_a$ has a negative sign, then $X_s$ will be at a digital "0" level. The level of $Y_s$ is similarly related to the sign of $Y_a$. The $X_s$ output controls the actuation of switch circuit 72, whereby either switch 76 or switch 78, but not both, are actuated at any given time. If $X_s$ has a digital "1" level, then switch 76 will be closed, and the output of adder 64 directly connected to one input of adder 36. If $X_s$ had a digital "0" level, then switch 76 will be open. $X_s$ indirectly controls the actuation of switch 78 through inverter 88. Because of this connection, when switch 76 is closed, switch 78 is open, and visa-versa. Switch circuit 74 in the Y correction circuit is similarly controlled by the $Y_s$ output of absolute value circuit 42. Thus, switch 80 is directly controlled by $Y_s$, while switch 82 is indirectly controlled by $Y_s$ through inverter 90. Inverters 84 and 86 include variable resistors 92, and 94, respectively, to provide the necessary minor adjustments to compensate for small non-symmetries in the system.

The total correction signal provided by the X and Y correction circuits, $X_{tc}$ and $Y_{tc}$, are added to the major positioning signals $X_a$ and $Y_a$ by adder circuits 36 and 40, respectively. The combined signals $X_t$ and $Y_t$ are directed through respective deflection amplifiers 96 and 98 to the deflection yoke 100. These signals thus produce the desired positioning of the electron beam within the cathode ray tube.

Figure 7:
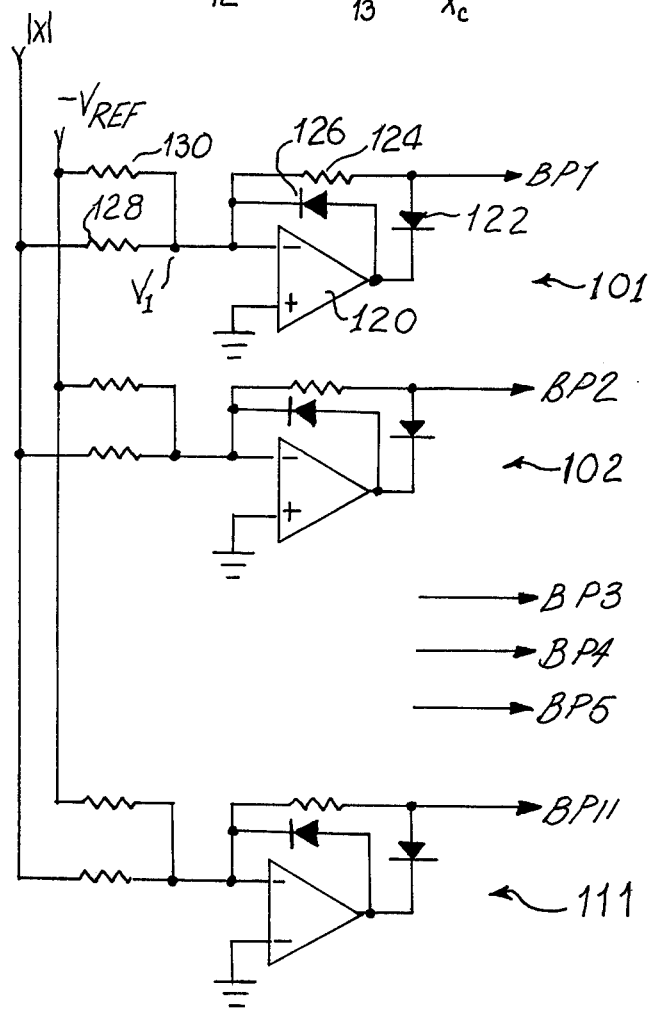
FIG. 7 is a schematic diagram of the breakpoint circuits used in the present invention.

Referring now to FIG. 7, breakpoint circuit 44 will be described in greater detail. Breakpoint circuit 44 is comprised of eleven breakpoint amplifiers 101 to 111, of which three are shown. The breakpoint amplifiers are each constructed similarly. Due to the similarity of construction and operation of all eleven breakpoint amplifiers, description will only be given with reference to breakpoint amplifier 101. It will be seen that breakpoint amplifier 101 includes an operational amplifier 120 having inverting and non-inverting inputs. A feedback network is provided having two feedback paths connected in parallel, and is comprised of a diode 126, connected in parallel across the series combination of a resistor 124 and a diode 122. This feedback network is connected between the output of amplifier 120 and the inverting input thereof. The inverting input of operational amplifier 120 is also connected through resistor 128 to the output of absolute value circuit 38, and through resistor 130 to a reference voltage supply 132, both shown in FIG. 5.

Resistors 130 and 128 serve to add the voltages produced by reference voltage supply 132 and absolute value circuit 38 to produce a sum voltage $V_1$ at the common junction thereof. When the voltage $V_1$ attempts to drop below zero, operational amplifier 120 will produce a positive output voltage, thus causing diode 126 to become conductive. The current passing through diode 126 will cause a disturbance in the voltage $V_1$ which would otherwise exist at the junction of resistors 128 and 130. This disturbance will cause the voltage $V_1$ to increase until the voltage appearing on the inverting input of operational amplifier 120 is approximately the same as the voltage seen on the non-inverting input thereof. Since the non-inverting input is connected to ground, the voltage on the output of operational amplifier 120 will increase until the voltage seen at the inverting input thereof is also approximately zero. Since diode 122 is in a nonconductive state, there will be no current passing through resistor 124. Consequently, the voltage seen at the output of breakpoint amplifier 1, as taken from the junction of diode 122 and resistor 124, will be approximately the same as the voltage appearing at the inverting input to operational amplifier 120. As described previously, this voltage will be approximately zero.

As the voltage produced by absolute value circiut 38 increases, the voltage $V_1$ will also naturally attempt to increase and the amount of disturbing current passing through diode 126 will diminish until the point is reached at which no current passes therethrough. At this point, diode 126 will switch off. It will be appreciated that the voltage at which this occurs is substantially determined by the ratio of resistors 128 and 130. By using precision resistors, this threshold voltage can be selected with high precision. If the voltage produced by absolute value circuit 38 is increased beyond the threshold level, the voltage $V_1$ will tend to become positive, causing the output of operational amplifier 120 to become negative. This, in turn, causes diode 122 to become conductive. Current will pass through resistor 124 and diode 122 until the voltage $V_1$ is again balanced at a zero voltage level. As the output of absolute value circuit 38 is increased still further, the output of amplifier 120 will decrease accordingly, in a linear but inverted relationship thereto. Since diode 122 is in a conductive state, the voltage at the output of breakpoint amplifier 1 will follow the output of amplifier 120. Viewing the transfer characteristics of breakpoint amplifier 101, (BP1), as depicted graphically in FIG. 6, it will be seen that, until the voltage produced by absolute value circuit 38 reaches the threshold voltage $V_{B1}$, the output will be substantially zero. For input signals in excess of $V_{B1}$, BP1 will respond in a linear but inverted relation thereto. Breakpoint amplifiers 2 through 11 operate correspondingly, but with input resistors scaled to provide sequentially increasing breakpoint voltages $V_{B2}, V_{B3}, \ldots V_{B11}$.

Referring now to FIG. 8, an adder circuit is shown which may conveniently be used to generate the on-axis correction signal provided by block 48 in FIG. 5. The signal produced by absolute value circuit 38 is combined by resistors 160 through 171 with the outputs of breakpoint amplifiers 1 through 11. Each resistor is connected between the output of a corresponding circuit and the inverting input of a buffer amplifier 180, which has a feedback resistor 182. In a well known manner, this circuit will provide an output signal which is linearly related to the sum of the input signals. Since the amplifier is connected in the inverting mode, an incidental inversion in the algebraic sign of the output signal will occur.

A similar circuit may be used to provide the addition function required of the blocks indicated by numbers 36, 40, 50, 52, 54, 56, 64, and 68. In each case, only as many input resistors are necessary as there are inputs. Thus, for example, $Y_X$ generator 52 need have only five input resistors for additively combining and inverting the signals produced by five of the breakpoint amplifiers. Also, adder circuits 36, 40, 54, and 68 each require only two input resistors. With respect to adders 64 and 68, adjustable input resistors may be used to allow variation of the extent to which the on-axis and off-axis components affect the total correction signal.

Referring now to FIG. 9, a circuit is shown which may conveniently provide the functions required of absolute value circuits 38 and 42 of FIG. 5. Operational amplifier 200 has two feedback paths connected in parallel between the output and inverting input thereof. The first feedback path comprises a diode 202 connected in series with a resistor 204 so as to provide a feedback path for positive amplifier output voltages. The second feedback path comprises a diode 206 and a resistor 208 connected in series and arranged to provide a feedback path for negative amplifier output voltages. Since these feedback paths are connected in parallel, it will be appreciated that a conductive feedback path exists for both positive and negative output voltages whereby operational amplifier 200 operates in a linear mode in both cases. Input resistor 210 connects the input signal $X_a$ to the inverting input of operational amplifier 200. The purpose of providing two parallel feedback networks of this type is to separate the positive and negative portions of the amplifier output. Operational amplifier 212 together with its feedback resistor 214 and input resistors 216 and 218 comprise a differential amplifier for combining the voltages produced in the two feedback paths. Thus, when the output of amplifier 200 is positive, diode 202 will conduct and voltage $V_p$ will be positive. Since diode 206 will be nonconductive, voltage $V_n$ will reflect the voltage seen at the inverting input to amplifier 200, i.e., will be at approximately ground potential. Amplifier 212 will combine these voltages to provide a positive output voltage. When amplifier 200 produces a negative output, however, diode 206 will conduct and voltage $V_n$ will become negative. Since diode 202 will be nonconductive, voltage $V_p$ will be approximately zero. Because voltage $V_n$ is directed to the inverting input of amplifier 212, the output thereof will be positive. From this it will be seen that, regardless of the algebraic sign of the output of amplifier 200, the output of amplifier 212 will always be positive. Also, the output of amplifier 212, which is also operating a linear mode, will accurately reflect the magnitude of the signal produced by amplifier 200. From this it will be seen that the circuit described serves to provide a signal corresponding to the absolute value of the input voltage $X_A$.

Operational amplifier 220 serves to compare the output of amplifier 200 with a zero voltage level to provide an output indicative of the sign of the input signal. Thus, if the output of amplifier 200 is positive, the output of amplifier 220 will be saturated in a negative direction. If, on the other hand, the output of amplifier 200 is negative, the output of amplifier 220 will be saturated in the positive direction. Consequently, the output of amplifier 220 can be used to indicate the sign of the analog signal inputted to amplifier 200. The circuit shown in FIG. 9 serves, therefore, to separate an input signal, $X_A$, into its component sign and magnitude portions, thus providing the functions necessary for absolute value circuits 38 and 42.

From the foregoing, it will be seen that a circuit has been described which provides correction signals to be combined with an analog control signal to thereby linearize the response of a radiant beam deflection system. Also, it will be seen that independent on-axis, and off-axis correction signals have been produced which are then combined to provide the total correction signal. Finally, it will be understood that the foregoing circuitry provides four quadrant compensation while only requiring circuitry for developing compensation signals in a single quadrant.

Although the invention has been described with respect to a preferred mebodiment, it will be appreciated that various arrangements and alterations of parts may be made without departing from the spirit and scope of the invention as defined in the following claims.

What is claimed is:

1. Apparatus for compensating for nonlinear deflection characteristics of a display system for displaying graphical images on an energy responsive surface with a radiant energy beam and having deflection means responsive to at least one deflection signal for controlling deflection of said beam, said nonlinear deflection characteristic being such that the amount of deflection error due to said nonlinearity is a function of the amount of deflection of said beam on said energy responsive surface and is greatest at the extremes of said deflection, said apparatus comprising:

means for providing a deflection signal linearly responsive to an input signal, and for scaling said deflection signal such that a deflection signal corresponding to an input signal indicative of maximum deflection will cause said deflection means to produce said maximum deflection substantially without compensation;

compensation means for generating a compensation signal having a non-monotonic functional relationship to said deflection signal, said functional relationship being selected so that said compensation signal, when additively combined with said deflection signal, will compensate said deflection signal for said nonlinear deflection characteristic of said display system; and means for additively combining said compensation signal and said deflection signal so as to provide a compensated said deflection signal for application to said deflection means.

2. Apparatus as set forth in claim 1, wherein said deflection signals may assume values having either first or second polarities and wherein said compensation means includes means responsive to the magnitude but not the polarity of said deflection signal for generating and compensation signal and said additive combining means includes means for combining the magnitudes of said compensation signal and said deflection signal, and for providing the sum signal so produced with a polarity in dependence upon the polarity of said deflection signal so as to provide a compensated said deflection signal.

3. Apparatus as set forth in claim 1, wherein said deflection means is responsive to X and Y deflection signals; said deflection signal providing means includes means for providing X and Y deflection signals; said compensation means includes means responsive to said X and Y deflection signals for generating X and Y compensation signals non-monotonically related thereto; and said additive combining means includes means for combining said X compensation signal and said X deflection signal to provide a compensated X deflection signal and means for combining said Y compensation signal and said Y deflection signal to provide a compensated Y deflection signal.

4. Apparatus as set forth in claim 3, wherein said means responsive to said X and Y deflection signals includes on-axis correction means for providing X and Y on-axis correction signals functionally related to said X and Y deflection signals, respectively, and off-axis correction means for providing X and Y off-axis correction signals, each functionally related to both said X and Y control signals and further wherein said additive combining means comprises means for additively combining said X on-axis correction signal, said X off-axis correction signal, and said X deflection signal to provide said compensated X deflection signal, and means for additively combining said Y on-axis correction signal, said Y off-axis correction signal, and said Y deflection signal to provide said compensated Y deflection signal.

5. Apparatus as set forth in claim 4, wherein said off-axis correction means includes third means for providing first and second signals nonlinearly related to said X deflection signal, fourth means for providing third and fourth signals nonlinearly related to said Y deflection signal, and multiplier means for multiplying said first signal by said fourth signal to thus generate said X off-axis correction signal, and said third signal by said second signal to thus generate said Y off-axis correction signal.

6. Apparatus as set forth in claim 5, wherein said means responsive to said X and Y deflection signals further includes a plurality of X breakpoint amplifier means each providing output signals linearly responsive to X deflection signals having magnitudes greater than a selected threshold level and unresponsive to X deflection signals having magnitudes smaller than said threshold level, a plurality of Y breakpoint amplifier means each providing output signals linearly responsive to Y deflection signals having magnitudes greater than a selected threshold level and unresponsive to Y deflection signals having magnitudes smaller than said threshold level and wherein said third and fourth means each include means for combining the output signals provided by selected said X and Y breakpoint amplifier means for respectively providing said first and second signals and said third and fourth signals.

7. Apparatus as set forth in claim 6, wherein said on-axis correction means includes means for subtracting the output signals provided by selected X breakpoint amplifier means from said X deflection signal to provide said X on-axis correction signal, and for subtracting the output signals provided by selected Y breakpoint amplifier means from said Y deflection signal to provide said Y on-axis correction signal.

8. Apparatus for compensating for nonlinear response characteristics of a display system for displaying graphical images on an energy responsive surface with a radiant energy beam and having beam deflection means for positioning said beam on said surface in response to deflection signals and wherein said deflection means has a nonlinear response characteristic which is substantially symmetrical with respect to a known deflection signal value whereby a deflection signal having a value greater than said known deflection signal value by a first amount requires a correction which is of the same magnitude but opposite polarity as the correction required by a deflection signal having a value which is less than said known deflection signal value by said first amount, said apparatus comprising:

means for detecting the difference between the value of said deflection signal and said known deflection signal value and for providing a first output signal having a value dependent upon the magnitude of said difference and a second output signal having a value dependent upon the polarity of said difference;

correction means responsive to said first output signal for providing a correction signal having a value in dependence thereupon; and combining means responsive to said deflection signal, said correction signal, and said second output signal for applying a correction to said deflection signal, said correction having a magnitude dependent upon said correction signal and a polarity dependent upon said second output signal so as to provide a compensated deflection signal for application to said deflection means.

9. Apparatus for compensating for nonlinear response characteristics of a display system for displaying graphical images on an energy responsive surface with a radiant energy beam and having deflection means responsive to X and Y deflection signals for controlling deflection of said beam, said apparatus comprising:

means for providing X and Y deflection signals;

on-axis correction means responsive to said X and Y deflection signals for providing an X on-axis correction signal having values functionally related to only said X deflection signal and a Y on-axis correction signal having values functionally related to only said Y deflection signal;

off-axis correction means responsive to said X and Y deflection signals for providing X and Y off-axis correction signals each having values functionally related to both said X and Y deflection signals; and, means for additively combining said X deflection signal, said X on-axis correction signal and said X off-axis correction signal to produce a compensated said X deflection signal, and for combining said Y deflection signal, said Y on-axis correction signal and said Y off-axis correction signal to produce a compensated said Y deflection signal.

10. Apparatus for compensating for nonlinear response characteristics of a display system for displaying graphical images on an energy responsive surface with a radiant energy beam and having deflection means responsive to at least one deflection signal, said apparatus comprising:

means for providing digital signals having values linearly representative of desired beam deflection;

conversion means responsive to said digital signals for providing uncompensated analog deflection signals having values proportional to the values of said digital signals;

compensation means responsive to said analog deflection signals for generating an analog compensation signal non-monotonically related thereto; and, means for additively combining said analog compensation signal and said analog deflection signal so as to provide a compensated said analog deflection signal for application to said deflection means.

* * * * *

UNITED STATES PATENT AND TRADEMARK OFFICE
CERTIFICATE OF CORRECTION

PATENT NO. : 4,104,566
DATED : August 1, 1978
INVENTOR(S) : Naren Chimanlal Shah It is certified that error appears in the above-identified patent and that said Letters Patent are hereby corrected as shown below:

Column 9, line 64, change the first appearance of "and" to --said--.

Column 10, line 14, before "deflection" insert thereat --Y--.

Signed and Sealed this

Tenth Day of April 1979

[SEAL]

Attest:

RUTH C. MASON
Attesting Officer

DONALD W. BANNER
Commissioner of Patents and Trademarks